(12) United States Patent
Emmett

(10) Patent No.: US 11,585,074 B2
(45) Date of Patent: Feb. 21, 2023

(54) DEVICE FOR RESISTING ROTATION OF A TAP

(71) Applicant: TAPLOK LIMITED, Lancaster (GB)

(72) Inventor: Robert Emmett, Lancaster (GB)

(73) Assignee: TAPLOK LIMITED, Lancaster (GB)

( * ) Notice: Subject to any disclaimer, the term of this patent is extended or adjusted under 35 U.S.C. 154(b) by 536 days.

(21) Appl. No.: 16/611,047

(22) PCT Filed: May 9, 2018

(86) PCT No.: PCT/GB2018/051235
§ 371 (c)(1),
(2) Date: Nov. 5, 2019

(87) PCT Pub. No.: WO2018/206937
PCT Pub. Date: Nov. 15, 2018

(65) Prior Publication Data
US 2020/0157786 A1 May 21, 2020

(30) Foreign Application Priority Data
May 9, 2017 (GB) .................................. 1707406

(51) Int. Cl.
E03C 1/04 (2006.01)
F16B 2/06 (2006.01)
F16B 37/04 (2006.01)

(52) U.S. Cl.
CPC ............ E03C 1/0401 (2013.01); F16B 2/065 (2013.01); F16B 37/041 (2013.01)

(58) Field of Classification Search
CPC .................................................... E03C 1/0401
See application file for complete search history.

(56) References Cited

U.S. PATENT DOCUMENTS

| 2,274,899 | A | * | 3/1942 | Johnson | F16B 17/004 411/392 |
| 4,463,460 | A | | 8/1984 | Arnold | |
| 6,301,728 | B1 | * | 10/2001 | Pilatowicz | E03C 1/0402 4/677 |
| 8,925,571 | B2 | * | 1/2015 | Li | E03C 1/0402 4/677 |
| 2008/0289698 | A1 | * | 11/2008 | Lin | E03C 1/0403 137/315.12 |
| 2009/0172878 | A1 | * | 7/2009 | Shieh | E03C 1/0401 285/204 |
| 2014/0048145 | A1 | | 2/2014 | Chong | |

FOREIGN PATENT DOCUMENTS

JP H10168960 A 6/1998
JP 2015014170 A 1/2015

OTHER PUBLICATIONS

International Search Report and Written Opinion for PCT/GB2018/051235 dated Aug. 29, 2018; 10 pages.

* cited by examiner

Primary Examiner — J C Jacyna
(74) Attorney, Agent, or Firm — Schwabe, Williamson & Wyatt, PC

(57) ABSTRACT

A device for resisting rotation of a tap fitted to a work surface comprises a body; an engagement formation for engaging with a part of the tap; and an attachment means for irrotatably attaching the device to the tap. The device further comprises fastening means for irrotatably fastening the device to a work surface.

11 Claims, 4 Drawing Sheets

DEVICE FOR RESISTING ROTATION OF A TAP

CROSS-REFERENCE TO RELATED APPLICATION

The present application is a national phase entry under 35 U.S.C. § 371 of International Application No. PCT/GB2018/051235, filed May 9, 2018, which designates the United States of America, which claims priority to GB Application No. 1707406.3, filed May 9, 2017, the entire disclosures of each of these applications are hereby incorporated by reference in their entireties and for all purposes.

TECHNICAL FIELD OF THE INVENTION

The present invention relates to a device for resisting rotation of a tap (or faucet) or multiple taps (or faucets).

BACKGROUND TO THE INVENTION

FIG. 1 shows cross-section of a known arrangement comprising a "worktop" or work surface 1 with a tap (or faucet) 3 attached thereto. The tap 3 can actuate a valve to control the release of water from the tap 3. The tap 3 is a mixer tap that can supply water at a desired temperature by mixing hot water and cold water. In order to open the valve to start the flow of water, the user lifts a handle 4 of the tap 3. In order to then select a desired water temperature, the user turns the handle 4 in either a clockwise direction or a counter-clockwise direction, depending on the desired temperature, which controls the relative flow of hot water and cold water through the tap 3. To then close the valve to stop the flow of water, the user lowers the handle 4 of the opened tap 3 and turns the handle 4 back to a central position.

The tap 3 comprises a substantially cylindrical body. The body of the tap 3 comprises an abutment portion 2 and a pipe 6 with a screw thread. The radius of the abutment portion 2 is greater than the radius of the pipe 6.

In order to fit the tap 3 to the work surface 1, the tap 3 is first inserted into a cylindrical hole through the work surface 1 so that the abutment portion 2 abuts with a top surface of the work surface 1 and the pipe 6 protrudes downwardly from a bottom surface of the work surface 1. A nut 5 is threaded onto the screw thread of the pipe 6 to secure the tap 3 to the work surface 1. The nut 5 is tightened until it is in contact with the lower surface of the work surface 1. The compressive force between the abutment portion 2 and the nut 5, combined with the friction between the nut 5 and the rough lower surface of the work surface 1, holds the tap 3 in its place. Thus, the tap 3 is secured to the work surface 1 both rotationally and axially.

However, over time, or due to vandalism, the repeated counter-clockwise and clockwise turning of the handle 4 may cause the tap 3 to become rotationally unsecured so that the tap 3 can freely rotate whilst fitted in its hole in the work surface 1. This problem may be caused by, for example, the nut 5 loosening on the screw thread of the pipe 6 thereby reducing the compressive force between the nut 5 and the abutment portion 2, or by the nut 5 wearing away the lower surface of the work surface 1 so that it becomes smooth, thereby lowering the frictional force between the nut 5 and the lower surface of the work surface 1. The problem of loosening over time can even occur with automatic taps (which are not intended to be turned, but operate based on a sensor) perhaps because of users attempting to turn the tap, unaware that it is automatic, or through vandalism.

Embodiments of the present invention seek to address the above problem, whilst the applicant's unpublished International (PCT) Patent Application No. PCT/GB2017/050087 (the entire content of which is incorporated herein) provides a solution to unwanted rotational movement of taps attached to sinks.

SUMMARY OF THE INVENTION

According to a first aspect of the present invention, there is provided a device for resisting rotation of a tap fitted to a work surface, the device comprising: a body; an engagement formation for engaging with a part of the tap; and an attachment means for irrotatably attaching the device to the tap wherein the device comprises fastening means for irrotatably fastening the device to a work surface.

In this way, the present invention provides for a device that can be used to block rotation of a tap relative to a work surface. After the device has been applied to a tap and fastened to a work surface, the tap can no longer become loose from the work surface during use, by loosening of a nut attached to the tap. Instead, rotational movement of the tap will attempt to rotate the device relative to work surface since the device is attached to the tap. However, it is not possible to rotate the device because the device is irrotatably fastened (via fastening means) to the work surface. The device is thus physically blocked from rotating because it is fastened irrotatably to the work surface. If the device cannot rotate, the tap cannot rotate because it is connected to the device by the attachment means. Accordingly, the above problem of a tap freely rotating is mitigated.

The attachment means preferably comprises a channel extending through the body to the engagement formation, in which a screw is arranged such that its tip can be driven into the part of the tap with which the engagement formation engages. The screw may comprise a head. The head may be larger than the channel through the body. The length of the screw from its tip to its head may be predetermined such that when the head is screwed up such that it abuts the body, the tip extends by a predetermined distance from the channel.

The predetermined distance from the channel by which the tip extends may be less than 2 mm and may be more than 0.5 mm. The distance may be so predetermined as to ensure that a depression is formed in the part of the tap adjacent to the engagement formation, in order to resist rotation, but the structural integrity of that part of the tap (which may be a pipe through which water flows) is not compromised.

In fact, the device can in effect become an integral part of the tap, by attachment thereto, and rather than simply resisting rotation of the tap relative to the work surface, in the event of the nut becoming loose, can completely replace the nut and resist both rotational and axial movement.

The fastening means may comprise one or more holes through the body, through which one or more corresponding fasteners, such as screws, for example wood screws, may be introduced to fasten the device to the work surface.

The fastening means may comprise fasteners, such as screws, for example wood screws (or such fasteners may be obtained separately by a user).

The holes may be counterbored, to receive the head of one or more fasteners.

The fastening means may extend perpendicular to the attachment means. The fastening means may extend parallel with the engagement formation.

The device may be dual purpose and also suitable for resisting rotation of a tap relative to a sink by comprising at least one distal edge may be arranged to abut a part of the sink, for example a downwardly depending (in normal use) part of the sink. In that case, the fastening means would not have to be used to fasten the device.

The body may be elongate. The body may be cuboid in shape. Thus, the body may have a substantially rectangular profile. The body may alternatively be I-shaped, substantially I-shaped, T-shaped, substantially T-shaped, M-shaped or substantially M-shaped. The body may comprise rounded or chamfered corners. The body may be formed from a rigid material. The body may be formed from metal or a polymer. The metal may be aluminium. The body may comprise one or more channels or apertures. The body may be shaped to fit around a hot water pipe and/or a cold water pipe.

The body may be formed from two or more body portions. In particular, the body may be formed from two body portions. The body portions may be substantially similar. The body portions may be securable together by one or more connectors such as screws, a set of nuts and bolts, or the like.

The device may comprise a plurality of distal edges for contacting with the sink. In particular, the device may comprise two distal edges, a first distal edge and a second distal edge, each distal edge being arranged to abut and interact with a part of the sink. The two distal edges may be provided oppositely about the engagement formation. The two distal edges may be aligned with one another. Each distal edge may be remote from the engagement formation. Each distal edge may be arranged to abut with a part of the sink that is remote from the tap and/or the engagement formation and is optionally a downwardly depending part of the sink. Each distal edge may comprise a flat surface and/or a curved surface. The flat surface or the curved surface may correspond to the shape of a part of a sink, in particular that corresponds to the shape of a part of the underside of a sink. Each distal edge may comprise rounded corners for assisting in contacting with a part of the sink. Each distal edge may be provided on the body.

The device may comprise one or more locking elements. The device may comprise a plurality of locking elements. The device may comprise two locking elements. Each distal edge may be provided on a locking element. The length of a locking element may be adjustable so as to allow for the distance between a distal edge and the engagement formation to be adjustable, and so that the distance between a distal edge and a part of the sink is adjustable when the device is mounted to a tap. Each locking element may be a bolt, a screw or the like. Each locking element may comprise a hexagonal head. Each locking element may be inserted or housed in the body. In this way, the locking elements provide the present invention with a means for adjusting the distance between the engagement formation and the distal edge(s), which means that the distance between the distance between the distal edge(s) and the tap to which the engagement formation engages is adjustable. This allows the present invention to be mounted to a variety of different sinks with different configurations.

The engagement formation may be arranged to fix to or engage with the underside of the tap. In particular, the engagement formation may be arranged to engage with a pipe of the tap or a rod of the tap.

The engagement formation may be integrally formed in the device.

The engagement formation may be substantially toroidal. Thus, the engagement formation may have a substantially circular profile.

The engagement formation may comprise an aperture. The aperture may be substantially circular. The aperture may be provided towards the centre of the body. In this way, the engagement formation may be provided with an aperture for placing over a pipe connected to a tap to engage the engagement formation with the tap.

The attachment means may comprise one or more channels. The attachment means may comprise a plurality of channels. Each channel may be integrally formed in the body. Each channel may be substantially cylindrical in shape. Each channel may comprise a screw thread on the inside surface of its circumferential wall. One or more channels may be oriented in the same longitudinal axis as the body. One more channels may be oriented perpendicular to the longitudinal axis of the body. One or more channels may be oriented at an angle to the longitudinal axis of the body. In particular, one or more channels may be oriented at 45° with respect to the longitudinal axis of the body.

The attachment means may comprise one or more screws. Each screw may sit within a channel. Each screw may comprise a screw thread on the outside circumferential surface of its body. Each screw may sit within a screw housing insert that can be inserted into a channel. Each screw housing insert may comprise a cylindrical tube. Each screw housing insert may comprise a screw thread on the inside surface of its circumferential wall. Each cylindrical tube may have ridges provided on its external surface for engagement with a corresponding surface of a channel. Each screw may be a grub screw (or set screw). Each screw or grub screw may comprise an engagement surface formed at its front end (or "tip") for biting into a part of a tap. The engagement surface may be pointed or V-shaped or most preferably a "dog-point" (i.e. cylindrical and of smaller diameter than the remainder of the screw). The engagement surface may be rounded. The engagement surface may be a rounded point. The engagement surface may be a cone point. Cone points are particularly preferred when the part of the tap which is engaged is a rod, e.g. a stainless steel rod, whereas where the part of the tap which is engaged is a pipe, a dog point is preferred. Likewise in the case of a pipe, a head larger than the channel is preferred to prevent the screw being inserted too far, whereas when the part of the tap is a rod, formed for example of stainless steel, this is not a problem, so a grub screw is preferred. The engagement surface may be U-shaped. Thus, each screw or grub screw may be arranged to contact with and create a depression on a pipe of the sink in order to fix the orientation of the connected tap relative to the sink. In this way, an attachment means may be provided for securely attaching an engagement formation, and therefore the device, to a tap.

The body may comprise a slot. The slot may be located distal to the engagement formation. The slot may be cut into an edge of the body, such as a perimetrical edge. The slot may be straight. The slot may have a cross section shaped for retaining a protrusion in the slot. The slot may have a substantially C-shaped cross section.

The device may further comprise one or more spacers. Each spacer may be arranged to dispose a distal edge away from the engagement formation so that the distal edge is remote from the engagement formation and thus remote from a tap engaged with the engagement formation. The device may comprise a plurality of spacers. In particular, the device may comprise two spacers. The number of spacers may be equal to the number of distal edges. Each spacer may be a block of a material such as a polymer. Each spacer may be cuboidal. Each spacer may comprise a protrusion that projects from a face. The protrusion may extend along the whole length of the spacer. The protrusion may have a substantially T-shaped cross section. The protrusion may be arranged to engage with the slot formed in the body so as allow for the spacer to be slidably mounted to the body. Each of the locking elements may be inserted or housed in a spacer. In this way, the spacers provide the present invention with a means for adjusting the distance between the engagement formation and the distal edge(s), which means that the distance between the distance between the distal edge(s) and the tap to which the engagement formation engages is adjustable. This allows the present invention to be mounted to a variety of different sinks with different configurations.

According to a second aspect of the invention there is provided a work surface comprising the device of the first aspect of the invention.

The worktop of the second aspect of the invention may comprise any feature of the first aspect of the invention.

According to a third aspect of the invention there is provided a method of resisting rotation of a tap fitted to a work surface, the method comprising the steps of:
  a) providing a device comprising a body, an engagement formation, an attachment means and a fastening means;
  b) engaging the engagement formation with a part of the tap; and
  c) irrotatably securing the device to the part of the tap by using the attachment means; and
  d) irrotatably fastening the device to the work surface by using the fastening means.

The method may further comprise the step of tightening a nut against a lower surface of the device so as to hold the device against the lower surface of the work surface prior to securing the device to the part of the tap and/or fastening the device to the work surface. The method may further comprise the step of removing the nut once the device has been irrotatably secured to the tap and/or fastened to the work surface.

The nut may be supplied (as usual) with the tap, but as the device is capable of acting to secure the tap to the work surface both irrotatably and against axial movement, such nut would not have to be durable and could feasibly be manufactured from polymers rather than metal as is currently the case.

The method of the third aspect of the invention may comprise any feature of the first or second aspects of the invention.

In particular, the attachment means may comprise one or more screws arranged to contact with the tap. The device may thus be secured to the tap by tightening each screw to form a depression in the tap. Each screw may be a grub screw (or set screw). Each screw or grub screw may comprise an engagement surface formed at its front end for biting into a part of a tap. The engagement surface may be pointed or V-shaped or a "dog-point" (i.e. cylindrical). The engagement surface may be rounded. The engagement surface may be a rounded point. The engagement surface may be a cone point. The engagement surface may be U-shaped.

DETAILED DESCRIPTION OF THE INVENTION

In order that the invention may be more clearly understood embodiments thereof will now be described, by way of examples only, with reference to the accompanying drawings, of which:

FIG. 1 is discussed above in the "Background to the Invention" and illustrates a sink 1 comprising a tap 3 according to the prior art.

Figure 1:
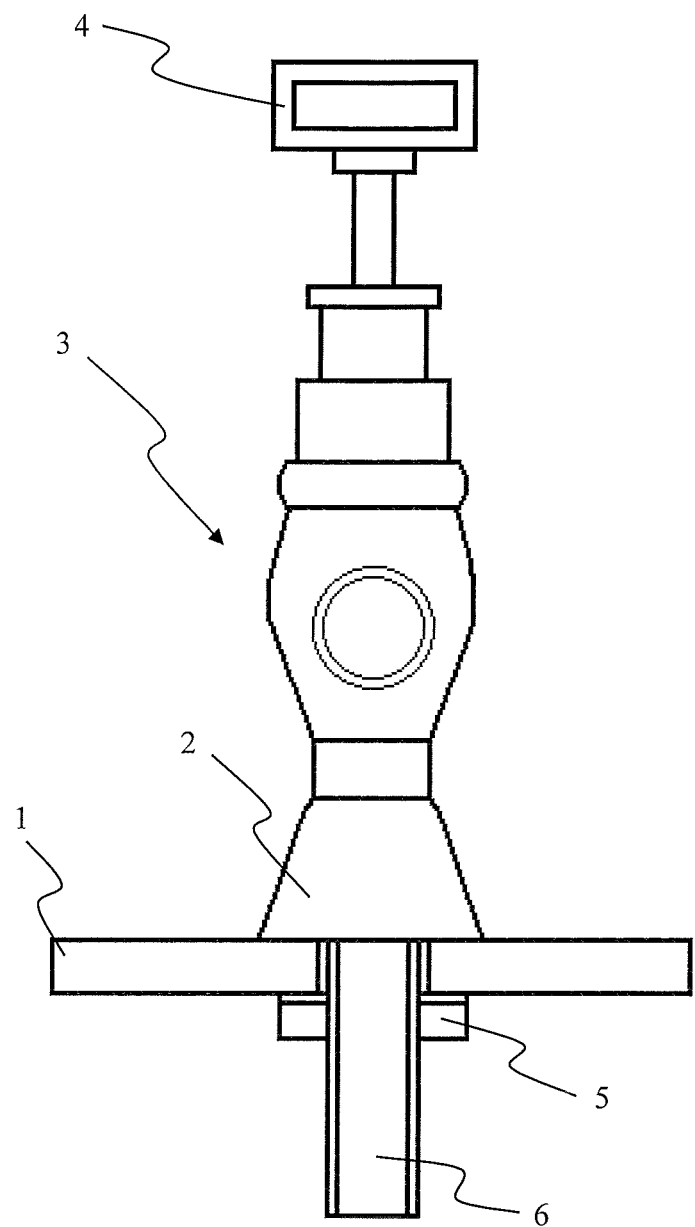
FIG. 1 is a part cross-section front view of a known work surface comprising a tap.
Figure 2:
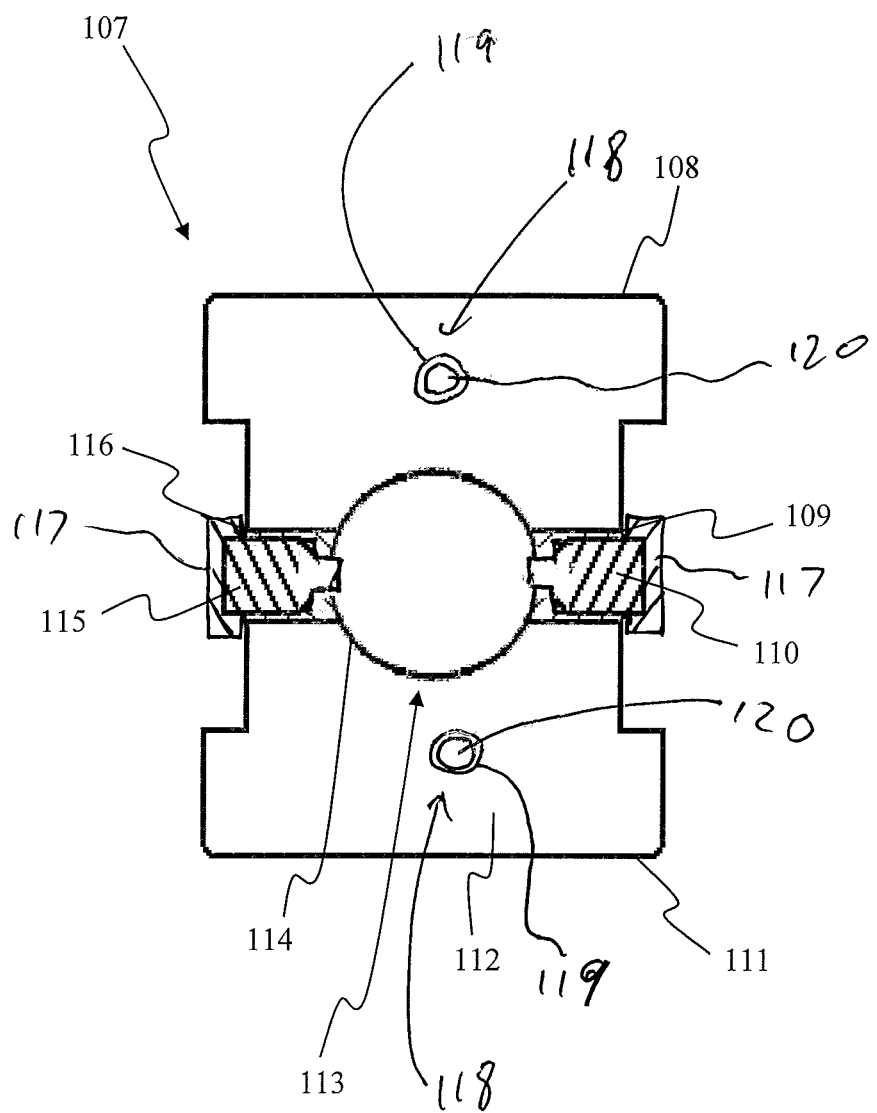
FIG. 2 is a cross-section of a plan view of a first embodiment of the present invention.
Figure 3:
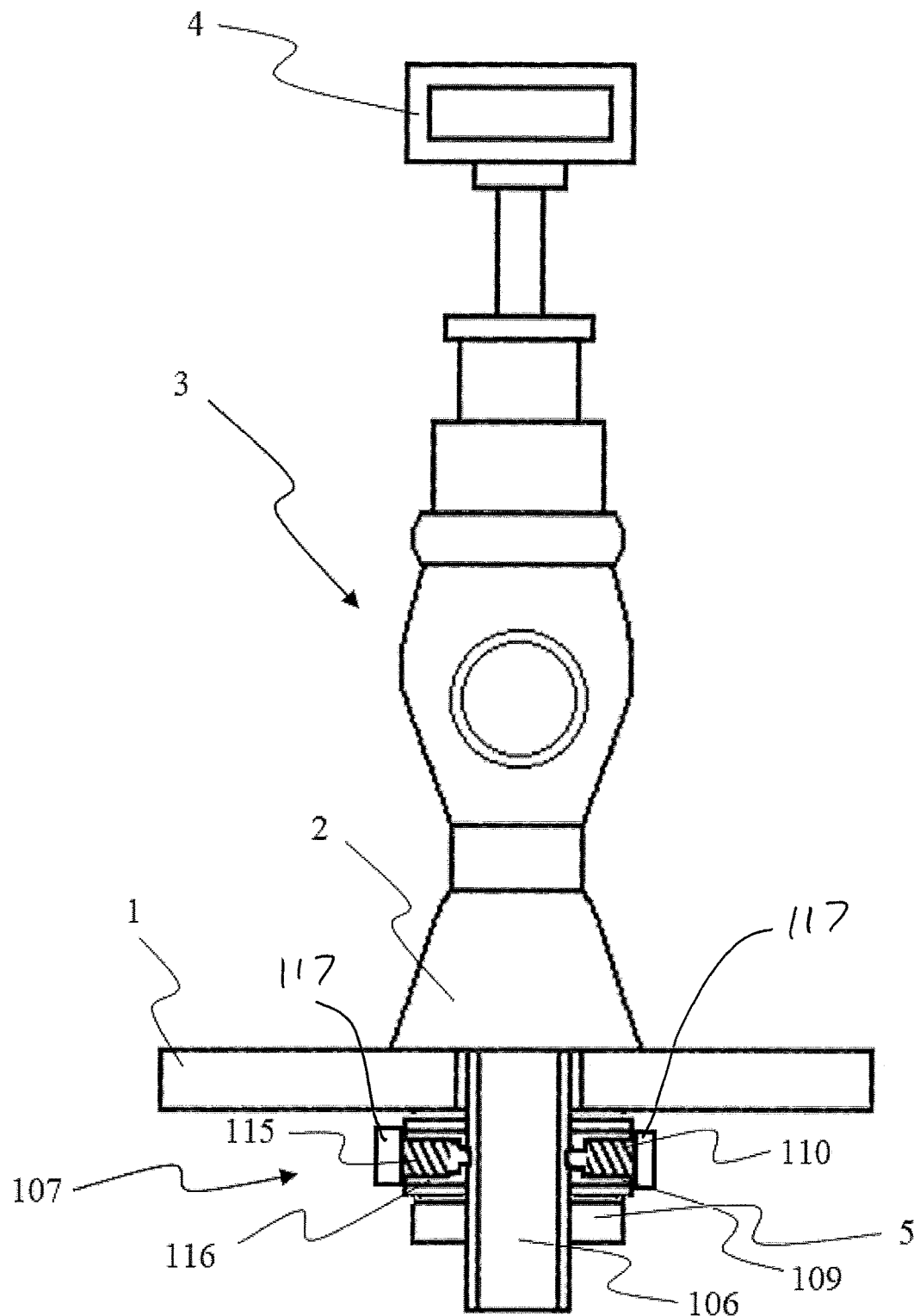
FIG. 3 is a part cross-section front view of the work surface shown in FIG. 1, with the first embodiment of the present invention shown in FIG. 2 being applied to the tap and the work surface in order to resist rotation of the tap.
Figure 4:
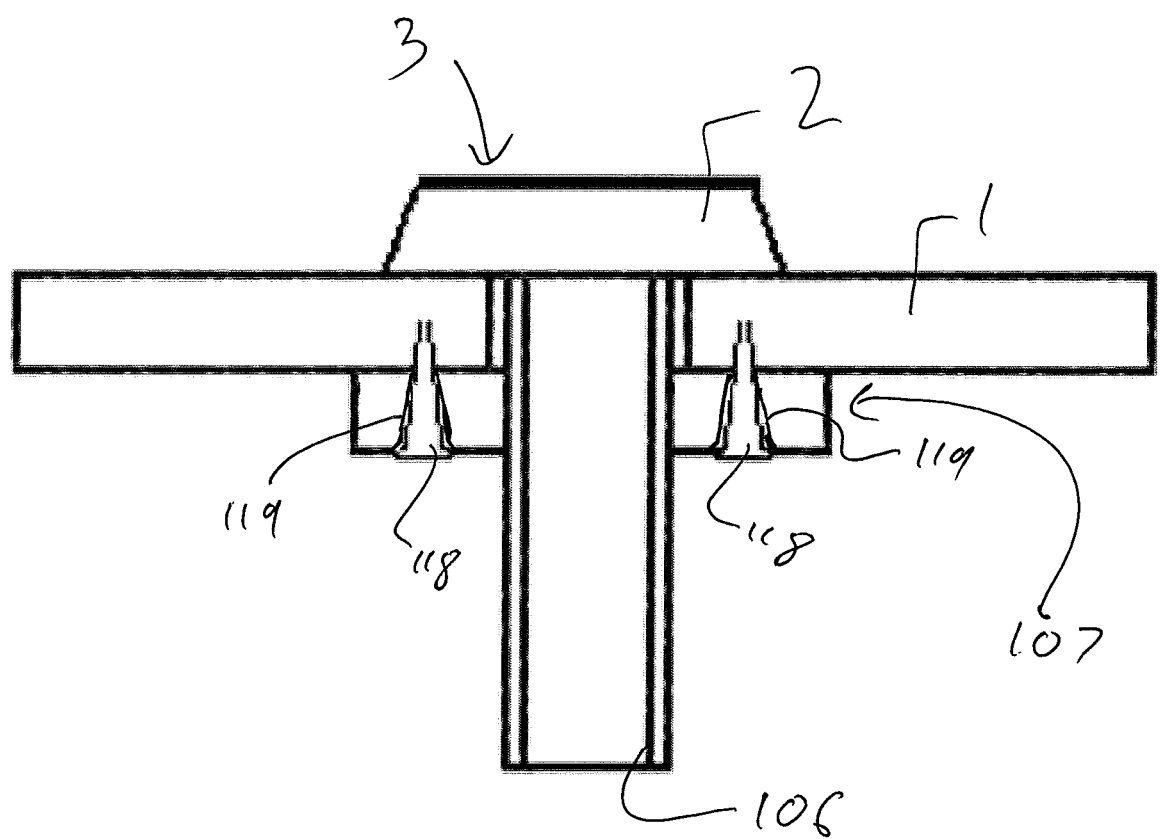
FIG. 4 is a part cross-section side view of the work surface and embodiment of the invention of FIG. 2 applied to the tap and the work surface.

Referring to FIGS. 2 to 4, a device 107 comprises a rigid generally planar body 112 and an engagement formation 113. The body 112 has an I-shaped profile, but may be considered broadly cuboidal, with one dimension substantially smaller than the two others, to provide the generally planar shape. In one specific example, the smallest dimension may be of the order of 5-15 mm, the length of the I-shaped profile being in the order of 60-100 mm and the width being in the order of 40-60 mm The engagement formation 113 is disposed in the centre of the body 112.

The device 107 comprises a first distal edge 108 and a second distal edge 111 provided oppositely about the engagement formation 113. The first distal edge 108 and the second distal edge 111 are each arranged to abut and interact with a part of a sink that is remote from the engagement formation 113, particularly a downwardly depending part of a sink. Each of the distal edges 108, 111 comprises a flat surface for contacting with a part of a sink, and curved corners to assist in fitting the device 107 to the sink.

The engagement formation 113 comprises a substantially circular aperture 114 extending through the plane of the body at its centre, such that the walls of the aperture are perpendicular to the plane of the body 112. The attachment means extends though the body 112 to the aperture. The attachment means comprises a first dog-point screw 110 and a second dog point screw 115. The first dog point screw 110 sits within a substantially cylindrical first channel 109 that houses a substantially cylindrical screw housing insert comprising a screw thread formed on the internal surface of its circumferential wall. The second dog point screw 115 also sits within a substantially cylindrical second channel 116 that houses a substantially cylindrical screw housing insert comprising a screw thread formed on the internal surface of its circumferential wall (obviously, the threads could instead be provided integrally in bores through the body 112). Each of the dog point screws 110, 115 comprise a substantially cylindrical body with an external screw thread provided on the outside circumferential surface of its body, a front end with a cylindrical point for biting into a surface, and a screw head 117 formed on its rear end. In other embodiments, the front end may comprise a U-shaped point or a v-shaped point for biting into a surface. The relative dimensions of the length of the screw from the head to the tip are carefully configured such that when the screw is tightened against the body 112 of the device 107 the tip extends just enough to create a depression in the pipe, without affecting its structural integrity.

The attachment means is formed in the middle part of the I-shaped body 112 so as to reduce the depth of the channels 109, 116 extending through the body perpendicular with the axis of the aperture through the body 112, such that the screws 110, 115 extend through the wall of the engagement formation.

In order to irrotatably fasten the device to the work surface 1, it comprises fastening means 118 in the form of two apertures 119 through the body 112, in which woodscrews 120 sit. Like the aperture of the engagement formation 113, the apertures extend through the plane of the body 112, from one side to the other (parallel with the engagement formation and perpendicular to the attachment means). They are arranged along the long axis of the body, so as not to interfere with the channels 109, 116 which are in the short axis of the body. In this embodiment, the wood screws 120 are cross-head screws, but of course they could be arranged to receive a flat-head screwdriver, or any other suitable driving means. The apertures 119 are counterbored to receive the heads of the screws, but again this is not essential. Likewise, two apertures 119 and two corresponding wood screws 120 are provided, but those skilled in the art will be able to devise other numbers of fastening means 118 and other suitable locations for irrotatably fastening the device 107 to the work surface 1. The body may be formed (e.g. by injection moulding, 3d printing or the like) from a polymeric plastics material.

Referring to FIG. 3, in order to fit the device 107 to the tap 3 and the work surface 1, the engagement formation 113 is engaged with the pipe 6 by placing the aperture 114 on to the pipe 6. Thus, the pipe 6 is effectively inserted into the aperture 114. The device 107 is then pressed upwards towards the work surface 1. The nut 5 that would normally be used to (often ineffectively) hold the tap in place, is then screwed onto the pipe 6 to bring the upper surface of the generally planar body 107 against the lower surface of the work surface 1.

To securely fit the device 107 to the tap 3, a user tightens the first dog point screw 110 and the second dog point screw 115 so that they protrude into the aperture 114. Thus, the grub screws 110, 115 both contact and engage with an external surface of the pipe 6. Specifically, the cylindrical front ends of each dog point screw 110, 115 bite into the outside surface of the pipe 6, forming a depression or deformation therein and locking the device 107 to the pipe 6. As set out above, the heads 117 are so-arranged that the screws 110, 115 cannot be overtightened and compromise the pipe 106, but do create a sufficiently deep depression in the pipe to prevent movement of the device 117 relative to the pipe.

With the device 107 fixed axially and rotationally with respect to the tap, the wood screws 118 can be screwed through the apertures 119 and into the work surface 1, so as to fasten the device irrotatably to the work surface 1. Of course, the installer may first mark the location where the screws will be attached to the work surface and could drill pilot holes into the work surface to aid the insertion of the wood screws.

The use of wood screws assumes a suitable work surface to receive wood screws, e.g. a solid wood surface, chipboard or the like. Alternative fasteners could be used for work surfaces formed of other materials.

With the device irrotatably fixed in position to the work surface 1, the nut 5 can be removed as shown in FIG. 4. Indeed, the nut 5 can be removed prior to attaching the device 107 to the work surface 1 if it would otherwise obstruct access to the screws 118. Alternatively, it can be left attached, or re-attached to the pipe 106, beneath the device 107, if desired.

In use, the device 107 effectively replaces the nut 5 irrotatably securing the tap 3 to the work surface 1 to prevent it from rotating in place. In consequence, if the nut is maintained and it fails, the tap 3 still cannot freely rotate, because both it and the work surface are irrotatably attached by the device. If the tap 3 is vandalised and an attempt is made to force it to rotate, the strength of the connection by means of the attachment of the dog-point screws to the depressions formed in the part of the tap 106 and the wood screws 118 to the work surface can be greater than the level of force that can be applied by a vandal twisting or kicking the tap 3. Optionally, the fasteners 118 could be arranged to shear at a predetermined force, so as to prevent damage to the tap or work surface in the event of extreme vandalism. However, for home use, where such vandalism cannot be expected and free rotation is normally the result of frequent twisting of the tap 3 when opening or closing it, a shearing function would not be required.

The device 107 provides a means for resisting and ideally preventing rotation of the tap 3 by connecting the tap 3 to the sink 1 in a fixed arrangement. If the tap 3 becomes loose from the sink 1 then due to its engagement with the engagement formation 113 of the device 107, rotation of the loose tap 3 would attempt to rotate the body 112 of the device 107 about the loose tap 3. However, the first distal edge 108 is in contact with the first downwardly depending part 17 of the sink 1 and the second distal edge 111 is in contact with the second downwardly depending part 18 of the sink 1. The body 112 is therefore in contact with the sink 1, in two separate regions in this embodiment, and so it cannot rotate about the tap 3 because its contact with the sink 1 physically blocks it from doing so. Consequently, with the device 107 fitted, the loose tap 3 cannot rotate relative to sink 1.

Of course, owing to the provision of distal edges 110, 118, the device could also be used as set out in International (PCT) Patent Application No. PCT/GB2017/050087 to contact a downwardly depending part of a sink and prevent rotation in that manner.

Further modifications, such as described in International (PCT) Patent Application No. PCT/GB2017/050087 could also be made. For example, alternative attachment screws could be used; different shapes of body could be used; the engagement formation could engage with a threaded rod depending from the tap, rather than a pipe 106 (indeed, a plurality of engagement formations could be provided to engage with a plurality of such rods, or a plurality of such pipes).

The above embodiments are described by way of example only. Many variations are possible without departing from the scope of the invention as defined in the appended claims.

The invention claimed is:

1. A device for resisting rotation of a tap fitted to a work surface, the device comprising:
a body;
an engagement formation to engage a pipe of the tap or a rod of the tap formed at an underside of the tap; and
an attachment means comprising one or more channels extending through the body to the engagement formation with a screw arranged in each of the one or more channels;
wherein the device comprises one or more elongate fastening screws extending through the body, perpendicular to the attachment means for irrotatably fastening the device to the work surface, wherein the elongate fastening screws are wood screws,
wherein the screw arranged in the or each one or more channels through the body has a tip with an engagement surface formed at a front end and a head larger than the one or more channels through the body and the screw has a length from the tip to the head such that the tip extends by a predetermined distance from the or each one or more channels through the body to form a depression into the pipe of the tap or a rod of the tap when the head abuts the body for irrotatably attaching the body of the device to the tap.

2. A device according to claim 1, in which a screw is arranged in the or each one or more channels through the body such that its tip can be driven into the part of the tap with which the engagement formation engages.

3. A device according to claim 1 further comprising one or more holes through the body, through which the one or more elongate fastening screws are introduced to fasten the device to the work surface.

4. A device according to claim 1, wherein the or each hole is counterbored, to receive the head of one of the one or more elongate fastening screws.

5. A device according to claim 1 wherein the body is formed of a plastics material.

6. A device according to claim 1 wherein the engagement formation comprises an aperture integrally formed in the device and having a substantially circular profile.

7. A device according to claim 2 wherein the or each screw comprises an engagement surface formed at its tip for biting into a part of the tap; the engagement surface being a dog-point.

8. A work surface comprising the device according to claim 1.

9. A method of resisting rotation of a tap fitted to a work surface, the method comprising the steps of:
providing a device comprising a body, an engagement formation to engage a pipe of the tap or a rod of the tap formed at an underside of the tap, an attachment means comprising one or more channels extending through the body to the engagement formation with a screw arranged in each of the one or more channels, wherein the screw has a tip with an engagement surface formed at a front end and a head larger than the one or more channels through the body and the screw has a length from the tip to the head such that the tip extends by a predetermined distance from the or each one or more channels through the body when the head abuts the body and one or more elongate fastening screws extending through the body, perpendicular to the attachment means wherein the elongate fastening screws are wood screws;
engaging the engagement formation with a part of the tap;
tightening the screw to form a depression into the pipe of the tap or a rod of the tap to irrotatably secure the device to the part of the tap by using the attachment means; and
irrotatably fastening the device to the work surface by using the one or more elongate fastening screws.

10. A method according to claim 9 further comprising the step of tightening a nut against a lower surface of the device so as to hold the device against the lower surface of the work surface prior to securing the device to the part of the tap and/or fastening the device to the work surface.

11. A method according to claim 10 further comprising the step of removing the nut once the device has been irrotatably secured to the tap and/or fastened to the work surface.

\* \* \* \* \*